United States Patent
Blanding

(10) Patent No.: US 8,156,502 B1
(45) Date of Patent: Apr. 10, 2012

(54) COMPUTER RESOURCE ALLOCATION AS A FUNCTION OF DEMAND TYPE

(75) Inventor: William H. Blanding, Bow, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1341 days.

(21) Appl. No.: 11/760,635

(22) Filed: Jun. 8, 2007

(51) Int. Cl.
 *G06F 9/46* (2006.01)
(52) U.S. Cl. .................. 718/104; 718/100; 718/102
(58) Field of Classification Search .............. None
 See application file for complete search history.

(56) References Cited

U.S. PATENT DOCUMENTS

| | | | |
|---|---|---|---|
| 6,948,172 B1 * | 9/2005 | D'Souza | 718/106 |
| 6,957,435 B2 | 10/2005 | Armstrong et al. | |
| 6,988,134 B2 | 1/2006 | Thorpe et al. | |
| 7,089,306 B2 | 8/2006 | Thorpe et al. | |
| 7,093,250 B1 * | 8/2006 | Rector | 718/100 |
| 7,398,432 B2 * | 7/2008 | Arbeitman et al. | 714/57 |
| 7,617,375 B2 * | 11/2009 | Flemming et al. | 711/173 |
| 7,644,153 B2 * | 1/2010 | Talwar et al. | 709/224 |
| 7,681,198 B2 * | 3/2010 | Blaisdell et al. | 718/106 |
| 7,945,913 B2 * | 5/2011 | Kashyap | 718/105 |
| 2002/0116441 A1 * | 8/2002 | Ding et al. | 709/105 |
| 2003/0037092 A1 * | 2/2003 | McCarthy et al. | 709/104 |
| 2003/0172104 A1 * | 9/2003 | Hooman et al. | 709/103 |
| 2004/0168170 A1 * | 8/2004 | Miller | 718/104 |
| 2005/0108717 A1 * | 5/2005 | Hong et al. | 718/102 |
| 2005/0183084 A1 * | 8/2005 | Cuomo et al. | 718/100 |
| 2006/0117317 A1 * | 6/2006 | Crawford et al. | 718/104 |
| 2006/0224741 A1 * | 10/2006 | Jackson | 709/226 |
| 2007/0028300 A1 * | 2/2007 | Bishop et al. | 726/22 |
| 2007/0234365 A1 * | 10/2007 | Savit | 718/104 |
| 2007/0240161 A1 * | 10/2007 | Prabhakar et al. | 718/104 |
| 2008/0172673 A1 * | 7/2008 | Naik | 718/104 |

* cited by examiner

*Primary Examiner* — Meng An
*Assistant Examiner* — Tammy Lee

(57) ABSTRACT

A method of allocating computer resources to workloads involves monitoring utilization of computer resources by workloads to generate utilization as a function of time data. The utilization data is used to classify workloads into demand types as a function of the utilization data. A workload manager plans and implements an allocation of computer resources to the workloads in part as a function of the demand types of the workloads.

40 Claims, 2 Drawing Sheets

COMPUTER RESOURCE ALLOCATION AS A FUNCTION OF DEMAND TYPE

BACKGROUND OF THE INVENTION

Workloads consist of computer-executable entities to which the assignment of hardware and software computing resources can be controlled. It is usual to consider workloads as executing in resource containers/compartments/partitions to which computing resources may be allocated and assigned. Of particular interest here are containers that are subdivisions of an operating system instance. That is, each such container contains a workload that in turn consists of one or more processes executing within that operating system. The operating system that provides the facility to construct said containers also provides means by which executing processes may be assigned to one of said containers and by which the assignment of resources to said containers may be controlled.

Workload management software functions by monitoring operating parameters (e.g., resource utilization of various resource types such as processors, memory, I/O and communication channels, software, etc) of workloads, predicting the resources required to maintain these operating parameters of each workload near user-specified targets, and allocating and assigning resources to workloads based on these predictions and other resource management parameters. Some of these other resource management parameters (e.g., the minimum and maximum resource levels that a partition can support) are hardware or software related, while others (e.g., minimum, maximum, and owned) are specified by the user.

Workload management software strives to provide more effective use of computing resources and thus reduce computer system costs, through automated management. Workloads with different operating characteristics, e.g. different patterns and levels of resource demand, must be managed in different ways in order to accomplish this. For example, "batch" workloads versus "interactive" or "transactional" workloads pose special problems for workload management.

Batch workloads typically consist of a process or processes with high and relatively constant demand for computing resources for an extended period of time. In contrast, interactive or transactional workloads have processes with lower but highly variable demand with short periods of activity in response to user input interspersed with little or no use of resources while awaiting further input. Interactive and batch workloads are frequently mixed in the same operating system instance. When this occurs the demands of batch workloads can starve interactive/transactional workloads of resources, thus severely degrading responsiveness to users served by the interactive workloads.

One prior-art solution provides for manually differentiating and manipulating processes to achieve effective resource use. For example, versions of the UNIX operating system provide a "nice" command through which certain processes may be manually designated to receive lower priority access to processing resources. Automated workload management systems may provide a manual means for users to designate particular processes for specific management treatment. The gWLM ("global WorkLoad Manager") product available from Hewlett-Packard Company, for example, provides a method through which any process within an operating system instance may be assigned to any specific workload for which the user will have previously specified resource management parameters. The user may either have special knowledge that certain processes require special treatment, may detect processes requiring such treatment by monitoring process activity, or, most likely, be responding to a detected exception condition or problem report. However, this approach imposes a considerable burden on the user, especially for large-scale systems running multiple operating systems, each with multiple processes.

Another solution to this problem requires workload management software users to provide some a priori static identifying information, e.g., the name of an executable program and/or of the user account under whose auspices a program is executed, through which different processes can be classified and assigned to different workloads. For example, in a method supported by gWLM ("global WorkLoad Manager") and WLM ("WorkLoad Manager") products available from Hewlett-Packard Company, workloads can be created and associated with descriptions of process identifiers such as the names of user accounts under which the processes are executed, or the names of the executable image that is being executed by the process. These descriptions are then matched with the corresponding characteristics of actual executing processes by the workload management software. Processes matching the same set of specified characteristics are assigned to the same associated workload (and to the workload's resource container) and thus managed as an entity by the workload management software using the resource management parameters previously specified by the user.

Herein, related art is described to facilitate understanding of the invention. Related art labeled "prior art" is admitted prior art; related art not labeled "prior art" is not admitted prior art.

Figure 1:
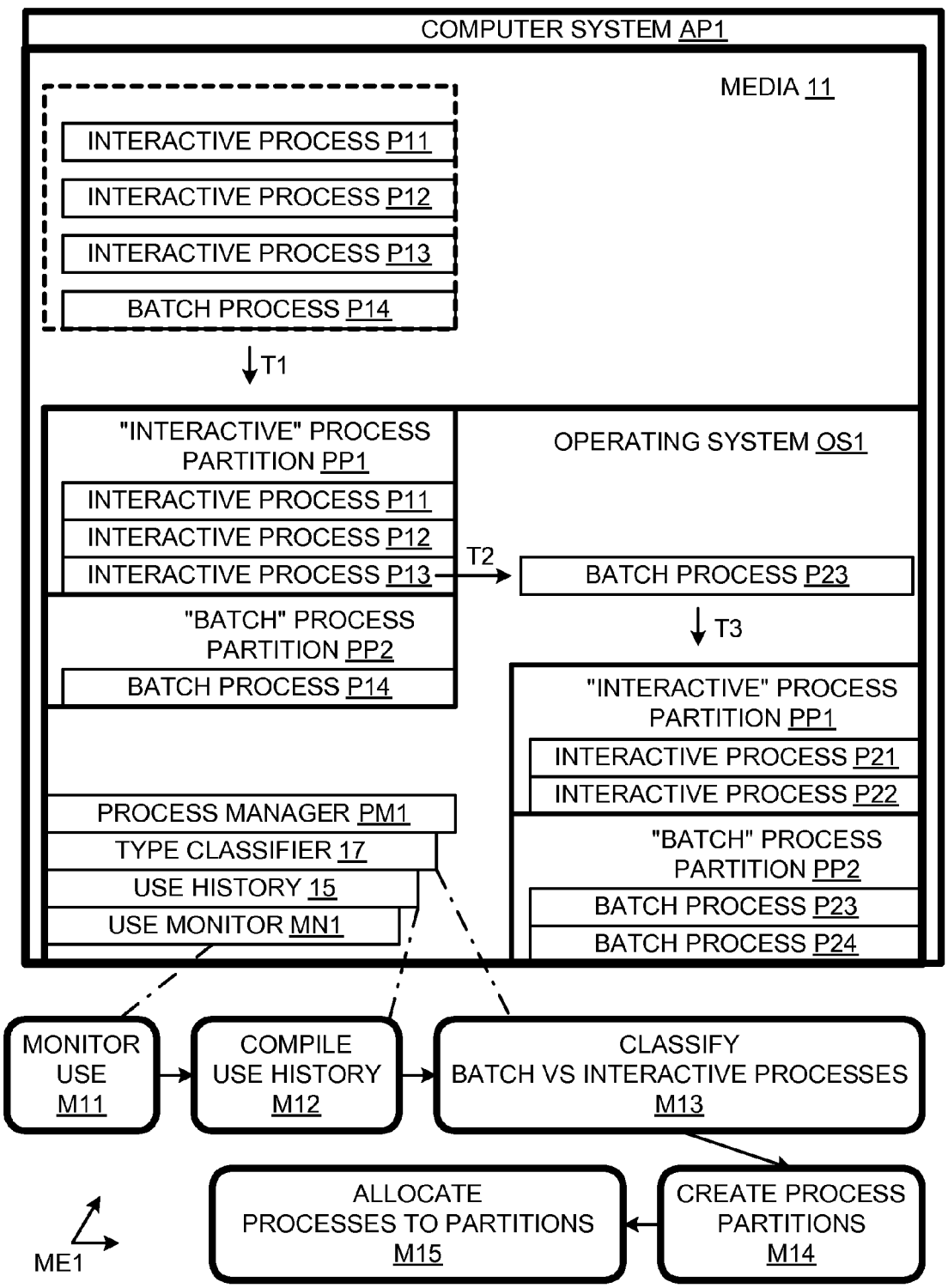
FIG. 1 is a combination schematic diagram and flow chart of a system and a method in accordance with embodiments of the invention.

The figures depict implementations/embodiments of the invention and not the invention itself. In the figures, "use" is an abbreviated form of "utilization".

DETAILED DESCRIPTION

In the course of the present invention, several problems with the prior art were recognized. One problem with the prior art is that it is frequently not possible to select static identifiers such as executable name or user account that correlate well with process operating characteristics. That is, for example, processes with batch and interactive characteristics may be executed under the same user account or initiated by the same executable. With the prior art solution, these processes would be assigned to the same workload and managed together with the result that the performance of the interactive processes would suffer. This is a problem solved by this invention.

A further problem with the prior art is that the operating characteristics of a process may change over time. That is, for example, a process may function for a time at a low level of resource demand but intermittently may have extended periods of higher demand. As a result, processes which can be managed together in a single workload at one time may best be managed separately at other times. Since static identifying characteristics do not change during the process' execution, they cannot help to identify changes in process operation. This is a problem solved by this invention.

Moreover, it was recognized that the above-described a priori approach does not address the fact that different processes, although indistinguishable in terms of static identifiers such as user account or executable name can have different operating characteristics. For example, a process may have batch or interactive characteristics depending upon the specific activities being performed. Thus, the operating characteristics of a process assigned according to name or user to a resource container set up to manage interactive processes could be or become more batch-like, so that undesirable interference between batch and interactive processes in the same resource container can occur. In such a case, a user may have to intervene to diagnose and correct.

The present invention provides for characterizing processes or workloads according to their actual execution characteristics. This is accomplished by monitoring the resource consumption history of processes within an operating system instance or of workloads which are whole operating system instances within a resource management domain (which may consist of multiple operating system instances), deriving statistical characterizations of resource use, classifying the processes or workloads into one of a set of resource consumption classes based upon those characterizations, and conditioning resource allocation and assignment at least in part upon the classification.

Resource consumption classes may be predefined and supplemented with classes with user specified parameters. Workload management workload definitions may reference defined classes or include implicit class definitions, either of which serves to identify (in conjunction with other parameters such as static process identifiers) processes which belong to the workload. Workload management policy definitions that are associated with workloads may in like manner reference the resource consumption classification determined for a workload as part of the policy's specification of resource management rules for the workload.

When the execution entities being monitored and characterized are processes, those processes can be assigned to workloads and associated resource containers in part on the basis of their resource consumption class as specified in the workload definitions. The user will have assigned resource management policies to each workload consistent with the workload's consumption classification.

When those entities consist of whole operating system instances the resource consumption class can serve as a reference parameter to resource management policies; so that said policies may vary resource management parameters in accordance with the consumption classification. Alternatively, in some cases (e.g., in a virtual machine environment), it may be possible to move said workloads between virtual machine hosts or to organize workloads into groups for purposes of resource management. In this case, desirable combinations of operating system instances may be determined, in part, based upon resource consumption classification.

Thus, even though separate processes have the same a priori identity (e.g., same executable name and/or same user), they can be assigned to different resource containers if their execution characteristics are different. The invention thus provides an additional tool for matching resource allocations to a user's business policies. More specifically, the invention provides a means of segregating interactive and batch workloads so that resource consumption of these classes of workloads can be managed effectively and interference of either with the other avoided.

A method in accordance with an embodiment of the invention is flow-charted in FIG. 1. The method is implemented on a computer system AP1, and the necessary software is stored on computer-readable media 11. A resource consumption monitor 13 monitors resource utilization by each process (or by those processes identified by static identifiers such as user or executable name) of an operating system OS1 on an ongoing basis at method segment M11. The consumption data generated by this monitoring is compiled into a resource consumption history 15 for said processes at method segment M12.

A type classifier 17 classifies said processes on the basis of their resource consumption history at method segment M13. Classification may be accomplished by logical rules and/or by deriving statistical parameters that characterize consumption history (such as minimum, average, and peak consumption over various time scales as well as appropriate variances) and comparing these parameters to pre- or user-defined templates specifying parameter ranges or characteristics for each classification.

Batch processes are recognized by their relatively constant and high consumption. That is, the average resource consumption on a short time scale is close to the average resource consumption on a longer time scale and the minimum and maximum are close together. Interactive processes are recognized by relatively low average resource consumption on a longer time scale punctuated by intermittent bursts of higher utilization (i.e. higher peaks of average demand on a shorter time scale as well as large differences between minimum and maximum consumption). In this way, processes P11-P13 are initially classified as "interactive", while process P14 is initially classified as "batch". In addition, other classifications can apply to other resource demand patterns, e.g., periodic, trending, and low-constant utilization. Classifications can be created by users to supplement predefined classes.

A partition manager 19 creates resource containers as necessary for separating or otherwise arranging processes by type at method segment M14. Prior to time T1, in FIG. 1, processes P11, P12, P13, and P14 are monitored to determine their respective types. As both batch and interactive processes are detected, partition manager 19 creates an "interactive" resource container PP1 and a "batch" resource container in this instance of method segment M14.

The contents of resource containers PP1 and PP2 are determined as they are formed. However, the invention does provide for moving processes into and out of said containers at method segment M15. For example, continued monitoring, compiling, and classifying (method segments M11-M13) results in a reclassification of process P13 from interactive to batch at time T2. Process manager 19 then moves process P13 from interactive container PP1 to batch container PP2. Alternatively, this procedure can be described as recreating resource containers to achieve the same result. In this, the result is that interactive processes P11 and P12 are contained in container PP1, while newly re-classified batch process P13 and continuing batch process P14 are contained in container PP2.

The workload manager creates resource containers/partitions and controls the assignment of resources to them using OS-provided facilities. The OS ensures that the resources are made available to the containers as requested and that they are "evenly" distributed to the processes executing within those containers. Thus it is the classification of the processes and their subsequent assignment to a particular workload and associated resource container that enables the workload manager to appropriately manage the resources made available to the various workloads and their constituent processes.

The invention may also be used for workload management at an inter-OS level. In this case, the classification is performed on the entire work being performed by each operating system instance, rather than individual processes within said operating system instances.

In the case where operating system instances are guest operating systems operating in a virtual machine environment that supports migration of guests between virtual machine environments, classifications may then be used to as a criterion in migration decisions. That is, for example, workloads characterized as having relatively constant demand may be relocated such that they are grouped together in one virtual machine environment, while intermittent or interactive workloads may be relocated to a second.

In the case where the operating system instance workloads operate in resource containers that cannot be migrated, but whose resource consumption is controllable, classifications may still be used in resource allocation. For example, excess resources may be allocated preferentially to interactive and similar workloads to accommodate likely bursts of resource demand. Resources may be also allocated preferentially at different times of day to workloads with diurnal demand patterns peaking at those times. The use of resources with which costs may be associated, e.g. for power consumption or for consumption of temporary capacity which is available for extra charge, may be allowed for some classifications but not for others.

Figure 2:
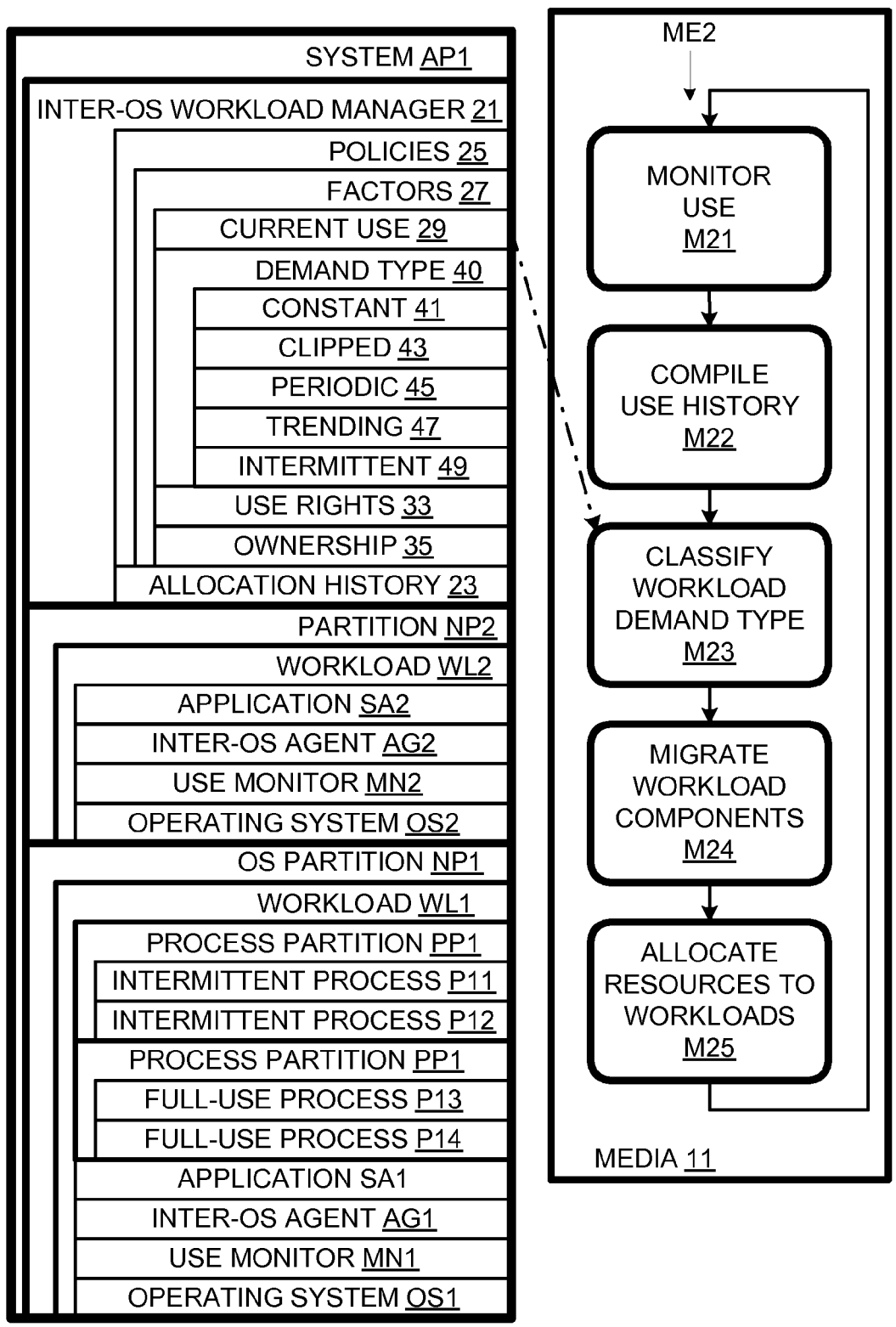
FIG. 2 is a combination schematic diagram and flow chart of another system and another method in accordance with embodiments of the invention.

As shown in FIG. 2, system AP1 includes two partitions NP1 and NP2. Partition NP1 runs workload WL1 that includes operating system OS1 (including use monitor MN1), an application SA1, and an inter-OS management agent AG1. Application SA1 is the source of processes P11-P14. Correspondingly, partition NP2 runs a workload WL2 that includes an operating system OS2 with a respective utilization monitor MN2, an application SA2, and an inter-OS agent AG2.

Inter-OS agents AG1 and AG2 gather utilization data from respective partitions NP1 and NP2 for use by inter-OS workload manager 21. Workload manager 21 compiles utilization data by workload over time in allocation history 23.

Workload manager 21 plans allocations in accordance with management policies 25, which specify factors 27 to be considered. These factors include predictions based on allocation history 23, current utilization 29, use rights 33, ownership 35, and demand type 40. Use rights 33 deals with situations in which computer resources are physically available, but licensing rights must be obtained prior to actual use of those resources. In some cases, use rights can be shifted among hardware resources. In any event, use rights must be taken into account when allocating computer resources. "Ownership" 37 refers to the various levels of requests for a workload, including minima, maxima, and ownership levels.

"Demand type" 40 involves classifying workloads according to utilization data in allocation history 23 into demand-type classes such as "constant" 41, "clipped" 43, "periodic" 45, "trending" 47, and "intermittent" 49. "Constant" is a demand level that is relatively constant so that percentage utilization drops as resources are added. "Clipped" indicates that demand exceeds the current resource allocation so that if resources are added, utilization will not drop proportionally and may stay the same. "Periodic" workloads are those that show periodic changes in demand, e.g., hourly, daily, weekly, monthly, and yearly fluctuations in demand. "Trending" workloads show long-term directional changes, e.g., gradual increases in time-averaged demand. "Intermittent" workloads are characterized by relatively long periods of low utilization with sporadic (non-periodic) periods of high utilization. Batch workloads are typically "clipped", while interactive workloads are typically classified as intermittent.

Workload manager 21 allocates resources to partitions NP1 and NP2 as a partial function of demand type, e.g., to "protect" intermittent processes so that the resources they require during peaks are available.

On the inter-OS level, each workload has its own partition. In systems with more hard partitions, the present invention provides for grouping partitions by workload demand types and making group-level allocations as a function of the group's demand type. At any level of workload management, the invention has the flexibility to match different demand types and to separate similar demand types, as appropriate.

At the inter-OS level, the invention provides a method ME2. At method segment M21, utilization is monitored per workload. At method segment M22, use data is compiled into a history. At method segment M23, workloads are classified by demand type. Some inter-OS level partition technologies can permit dynamic creation (and termination) of OS instance resource containers. For example, virtual machines can be created, e.g., by activating a dormant instance or cloning or moving a running instance. For such environments, method segment M24 makes migration decisions in part as a function of the classifications assigned to each OS instance workload. When dealing with hard partitions, the creation of new partitions is not typically available to a workload manager. However, in this case as well as in the case of workloads which have not be migrated where migration is possible, resources are allocated to partitions at method segment M25 in part as a function of the classifications which have been assigned to the various workloads. Method ME2 can be embodied as software on computer readable media 11.

'Use rights", as the phrase is used herein, refers to a user's rights to use specific hardware resources. "Limited use rights" and "limited rights to use" and "right-to-use limitations" all refer to situations in which there is hardware installed within a computer system for which a user does not have use rights, but for which use rights may generally be obtained, either permanently or temporarily, at some cost or under some conditions.

A "computer" is a machine that manipulates data in accordance with instructions. A "server" is a computer that provides services, e.g., serves web pages to or responds to database queries from other computers. A "computer program" or "program" is an ordered series of computer-executable instruction. As used herein, a "program" is inherently tangibly embodied in computer-readable media. Herein, "software agents" are computer programs, and a computer "workload" is a program or set of programs.

"Computer-readable media" refers to media that can be accessed by a computer and includes volatile and nonvolatile, removable and non-removable media. By way of example, and not limitation, computer-readable media may comprise computer storage media and communication media.

"Computer storage media" includes volatile and nonvolatile, removable and non-removable media implemented in any method or technology for storage of information such as computer-readable instructions, data structures, program modules or other data. "Computer storage media" encompasses, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer.

"Communication media" encompasses computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of "computer-readable media".

"Workload management" is a process of allocating computer resources to computer workloads. Herein, a "workload" is a process or group of processes involving or resulting from execution of one or more programs of computer-executable instructions. Workloads can be defined at different levels of a computer system hierarchy. At an inter-OS level, workloads typically include an operating system instance along with any software running on the OS. Virtual machine guest operating systems can be treated as individual workloads or as workload components which altogether comprise a single workload. At an intra-OS level, workloads include, for example, one or more processes, hardware threads, and software threads. A workload can be characterized by "performance" parameters, such as the rate at which work is done or how fast a workload responds to requests. Performance parameters typically reflect a purpose of the workload.

A workload component is a subdivision of a workload, such as a process, when a workload is a group of one or more processes. Resource management is performed for the workload as a whole, but resource consumption may be measured for individual workload components and the assignment of workload components to workloads can be altered.

A workload consumes "computer resources", which, in the present context, are quantifiable entities, the amount of which can bear on workload performance. Computer resources can be hardware, as well as other entities such as electrical power and license rights for other resources. At an inter-OS level, for example, resources such as processors, memory modules, and communications devices are distributed among operating system instances. At an intra-OS level, for example, cores, execution cycles, instruction pipelines, and cache capacity are distributed among processes and threads.

"Computer resources" encompasses hardware, software, and licenses that contribute to the work done by a computer. "Workload" refers to programs of instructions executing using said resources. Both computer resources and workloads have meanings that vary at different hierarchical levels. At an inter-OS level, computer resources include processors, memory modules, communications devices that can be allocated to an OS partition. An intra-OS level, computer resources can be finer grained entities corresponding to the above, but allocable to processes running within an OS instance.

"Allocation", herein, refers to a process of assigning computer resources to workloads. Depending on context, "allocating" can refer to planning such an assignment or implementing such an assignment. Implementation can depend on any containment technology involved. For example, computer resources can be added to or removed from a hard partition associated with a workload. Alternatively, a workload can be migrated from a partition with a first set of resources to a partition with a second set of resources.

Some technologies, e.g., process partitions and virtual machines, allow partitions to be created dynamically. In these cases, partition creation and extinguishing can become part of workload management. Thus, process partitions can be created to bundle like demand types, and virtual machines can be created to separate applications by demand type.

In addition, workload management can allocate resources to groups of partitions, whether real or virtual, inter-OS or intra-OS, where the groupings are defined by demand types. Resources can then be collectively allocated to groups, and then distributed among individual partitions. This allows the partitions of one group to be considered independently of another group. For example, a group of full demand-type has its own allocation and a group of intermittent demand-type partitions can have its own allocation. Then the intra-group allocations are independent of other groups.

The present invention provides for a variety of alternative embodiments. Allocations can be among any number of groups of OS-instances, individual OS instances, groups of processes, and individual processes. Classifications may be made based on one or more computer resource types considered jointly, or a separate classification may be made for each of one or more resource types. Demand types other than those discussed herein can be accommodated. In some cases, different demand types can be intentionally combined in a process partition because they complement each other. These and other variations upon and modifications to the illustrated embodiment are provided by the present invention, the scope of which is defined by the following claims.

What is claimed is:

1. A method of allocating computer resources to workloads comprising:
   monitoring utilization of computer resources by workloads and/or components of workloads to generate utilization data of one or more computer resource types as a function of time;
   classifying said workloads into demand types as a function of said utilization data;
   planning an allocation of said computer resources to said workloads in part as a function of the demand types of said workloads;
   implementing said allocation; and
   wherein said workloads are grouped into demand-type groups, said demand-type groups are assigned to partitions and said implementing involves transferring resources into or out of said partitions.

2. A method as recited in claim 1 wherein said implementing involves creating partitions to which said workloads may be assigned and assigning said workloads to said partitions according to demand type.

3. A method as recited in claim 1 wherein said implementing involves migrating workloads between partitions.

4. A method as recited in claim 1 wherein said planning involves grouping workloads by demand type to form workload groups to which some resources are collectively allocated.

5. A method as recited in claim 1 wherein at least one of said workloads includes at least one operating system.

6. A method as recited in claim 1 wherein at least two of said workloads are running on the same operating system instance.

7. A method as recited in claim 1 wherein said demand types are selected from a set including at least a full demand type with relatively low utilization variance for a given allocation of resources and an intermittent demand type having a relatively high utilization variance with a peak utilization in an allocation period more than twice its average utilization for the same allocation period.

8. A method of allocating computer resources to workloads comprising:
monitoring utilization of computer resources by workloads and/or components of workloads to generate utilization data of one or more computer resource types as a function of time;
classifying said workloads into demand types as a function of said utilization data;
planning an allocation of said computer resources to said workloads in part as a function of the demand types of said workloads;
implementing said allocation; and
wherein said workloads are grouped into demand-type groups, said demand-type groups are assigned to partitions and said implementing involves transferring workloads into or out of said partitions.

9. A method of allocating computer resources to workloads comprising:
monitoring utilization of computer resources by workloads and/or components of workloads to generate utilization data of one or more computer resource types as a function of time;
classifying said workloads into demand types as a function of said utilization data;
planning an allocation of said computer resources to said workloads in part as a function of the demand types of said workloads;
implementing said allocation; and
wherein said workloads are grouped into demand-type groups, said demand-type groups are assigned to partitions, and said implementing involves transferring workload components into or out of said partitions and transferring resources into or out of said partitions.

10. A method of allocating computer resources to workloads comprising:
monitoring utilization of computer resources by workloads and/or components of workloads to generate utilization data of one or more computer resource types as a function of time;
classifying said workloads into demand types as a function of said utilization data;
planning an allocation of said computer resources to said workloads in part as a function of the demand types of said workloads;
implementing said allocation; and
wherein said workloads are grouped into demand-type groups, said demand-type groups are assigned to existing partitions and/or to newly created partitions, and said implementing involves creating said partitions as necessary and transferring workload components into or out of said partitions and transferring resources into or out of said partitions.

11. A computer system comprising: computer resources; workloads running on said resources;
and a computer-executable workload manager for determining workload demand types and allocating said resources to said workloads in part as a function of demand type, said workload manager including a utilization monitor for monitoring resource utilization by said workloads to obtain utilization-over-time data for each of said workloads, said workload manager classifying said workloads by demand type as a function of said utilization-over-time data; and
wherein said workloads are grouped into demand-type groups, said demand-type groups are assigned to partitions and said allocating involves transferring resources into or out of said partitions.

12. A system as recited in claim 11 wherein said workload manager defined demand types include a full demand type which is characterized by relatively low utilization variance for a given resource allocation and an intermittent demand type which is characterized by a relatively high utilization variance.

13. A system as recited in claim 12 wherein said workloads are processes, said workload manager separating said processes by type by creating a separate partition for each demand type.

14. A system as recited in claim 13 wherein said workload manager assigns plural processes of said intermittent demand to the same process partition.

15. A system as recited in claim 11 wherein each of said workloads includes an operating system instance.

16. A system as recited in claim 15 wherein said workload manager allocates resources collectively to groups of said workloads of the same demand type.

17. A system as recited in claim 11 wherein said workload manager creates virtual machines and allocates resources to demand-type groups of said virtual machines having the same demand type.

18. A computer system comprising: computer resources; workloads running on said resources;
and a computer-executable workload manager for determining workload demand types and allocating said resources to said workloads in part as a function of demand type, said workload manager including a utilization monitor for monitoring resource utilization by said workloads to obtain utilization-over-time data for each of said workloads, said workload manager classifying said workloads by demand type as a function of said utilization-over-time data; and
wherein said workloads are grouped into demand-type groups, said demand-type groups are assigned to partitions and said allocating involves transferring workloads into or out of said partitions.

19. A computer system comprising: computer resources; workloads running on said resources;
and a computer-executable workload manager for determining workload demand types and allocating said resources to said workloads in part as a function of demand type, said workload manager including a utilization monitor for monitoring resource utilization by said workloads to obtain utilization-over-time data for each of said workloads, said workload manager classifying said workloads by demand type as a function of said utilization-over-time data; and
wherein said workloads are grouped into demand-type groups, said demand-type groups are assigned to partitions, and said allocating involves transferring workload components into or out of said partitions and transferring resources into or out of said partitions.

20. A computer system comprising: computer resources; workloads running on said resources;
and a computer-executable workload manager for determining workload demand types and allocating said resources to said workloads in part as a function of demand type, said workload manager including a utilization monitor for monitoring resource utilization by said workloads to obtain utilization-over-time data for each of said workloads, said workload manager classifying said workloads by demand type as a function of said utilization-over-time data; and
wherein said workloads are grouped into demand-type groups, said demand-type groups are assigned to existing partitions and/or to newly created partitions, and said allocating involves creating said partitions as necessary and transferring workload components into or out of said partitions and transferring resources into or out of said partitions.

21. Non-transitory computer-readable media comprising a computer-executable workload manager including a utilization monitor for monitoring utilization and generating utilization-over-time data, said workload manager classifying workloads according to demand type as a function of said data, said workload manager allocating computer resources to said workloads in part as a function of demand type; and wherein said workloads are grouped into demand-type groups, said demand-type groups are assigned to partitions and said allocating involves transferring resources into or out of said partitions.

22. Media as recited in claim 21 wherein the demand type for a workload is selected from a set of demand types including a full utilization type and an intermittent type.

23. Media as recited in claim 22 wherein said workload manager creates partitions so that workloads of the same demand type are in the same partition.

24. Media as recited in claim 23 where the variance of said intermittent type is greater than that of said full utilization type.

25. Media as recited in claim 21 wherein at least some of said workloads include operating system instances.

26. Media as recited in claim 21 wherein at least some of said workloads are intra-operating system processes.

27. Non-transitory computer-readable media comprising a computer-executable workload manager including a utilization monitor for monitoring utilization and generating utilization-over-time data, said workload manager classifying workloads according to demand type as a function of said data, said workload manager allocating computer resources to said workloads in part as a function of demand type; and
   wherein said workloads are grouped into demand-type groups, said demand-type groups are assigned to partitions and said allocating involves transferring workloads into or out of said partitions.

28. Non-transitory computer-readable media comprising a computer-executable workload manager including a utilization monitor for monitoring utilization and generating utilization-over-time data, said workload manager classifying workloads according to demand type as a function of said data, said workload manager allocating computer resources to said workloads in part as a function of demand type; and
   wherein said workloads are grouped into demand-type groups, said demand-type groups are assigned to partitions, and said allocating involves transferring workload components into or out of said partitions and transferring resources into or out of said partitions.

29. Non-transitory computer-readable media comprising a computer-executable workload manager including a utilization monitor for monitoring utilization and generating utilization-over-time data, said workload manager classifying workloads according to demand type as a function of said data, said workload manager allocating computer resources to said workloads in part as a function of demand type; and
   wherein said workloads are grouped into demand-type groups, said demand-type groups are assigned to existing partitions and/or to newly created partitions, and said allocating involves creating said partitions as necessary and transferring workload components into or out of said partitions and transferring resources into or out of said partitions.

30. A computer-implemented method comprising:
monitoring utilization of hardware computing resources by workloads to obtain respective utilization histories for said workloads;
classifying said workloads according to demand type as a function of their respective utilization histories so that plural workloads are characterized by an intermittent demand type in that they have relatively high utilization variances and plural other workloads are characterized by a constant demand type in that they have relatively low utilization variance;
grouping said workloads by demand types to create demand-type groups of workloads;
allocating said hardware computing resources to said groups at least in part according to their respective demand types; and
said workloads are grouped into demand-type groups, said demand-type groups are assigned to partitions and said allocating involves transferring resources into or out of said partitions.

31. A method as recited in claim 30 wherein:
said monitoring involves continuing to monitor after said workloads have been classified a first time to obtain modified utilization histories for said workloads; and
said classifying involves reclassifying at least one of said workloads according to its modified utilization history so that the demand type with which it is characterized changes from one demand type to another demand type.

32. A computer-implemented method comprising:
monitoring utilization of hardware computing resources by workloads to obtain respective utilization histories for said workloads;
classifying said workloads according to demand type as a function of their respective utilization histories so that plural workloads are characterized by an intermittent demand type in that they have relatively high utilization variances and plural other workloads are characterized by a constant demand type in that they have relatively low utilization variance;
grouping said workloads by demand types to create demand-type groups of workloads;
allocating said hardware computing resources to said groups at least in part according to their respective demand types; and
wherein said workloads are grouped into demand-type groups, said demand-type groups are assigned to partitions and said allocating involves transferring workloads into or out of said partitions.

33. A computer-implemented method comprising:
monitoring utilization of hardware computing resources by workloads to obtain respective utilization histories for said workloads;
classifying said workloads according to demand type as a function of their respective utilization histories so that plural workloads are characterized by an intermittent demand type in that they have relatively high utilization variances and plural other workloads are characterized by a constant demand type in that they have relatively low utilization variance;
grouping said workloads by demand types to create demand-type groups of workloads;
allocating said hardware computing resources to said groups at least in part according to their respective demand types; and
wherein said workloads are grouped into demand-type groups, said demand-type groups are assigned to partitions, and said allocating involves transferring workload components into or out of said partitions and transferring resources into or out of said partitions.

34. A computer-implemented method comprising:
monitoring utilization of hardware computing resources by workloads to obtain respective utilization histories for said workloads;
classifying said workloads according to demand type as a function of their respective utilization histories so that plural workloads are characterized by an intermittent demand type in that they have relatively high utilization variances and plural other workloads are characterized by a constant demand type in that they have relatively low utilization variance;
grouping said workloads by demand types to create demand-type groups of workloads;
allocating said hardware computing resources to said groups at least in part according to their respective demand types; and
wherein said workloads are grouped into demand-type groups, said demand-type groups are assigned to existing partitions and/or to newly created partitions, and said allocating involves creating said partitions as necessary and transferring workload components into or out of said partitions and transferring resources into or out of said partitions.

35. A system comprising non-transitory computer-readable storage media encoded with code that, when executed by a processor, causes:
monitoring utilization of hardware computing resources by workloads to obtain respective utilization histories for said workloads;
classifying said workloads according to demand type as a function of their respective utilization histories so that plural workloads are characterized by an intermittent demand type in that they have relatively high utilization variances and plural other workloads are characterized by a constant demand type in that they have relatively low utilization variance;
grouping said workloads by demand types to create demand-type groups of workloads;
allocating said hardware computing resources to said groups at least in part according to their respective demand types; and
said workloads are grouped into demand-type groups, said demand-type groups are assigned to partitions and said allocating involves transferring resources into or out of said partitions.

36. A system as recited in claim 35 wherein:
said monitoring involves continuing to monitor have said workloads have been classified a first time to obtain modified utilization histories for said workloads; and
said classifying involves reclassifying at least one of said workloads according to its modified utilization history so that the demand type with which it is characterized changes from one demand type to another demand type.

37. A system as recited in claim 36 further comprising said processor.

38. A system comprising non-transitory computer-readable storage media encoded with code that, when executed by a processor, causes:
monitoring utilization of hardware computing resources by workloads to obtain respective utilization histories for said workloads;
classifying said workloads according to demand type as a function of their respective utilization histories so that plural workloads are characterized by an intermittent demand type in that they have relatively high utilization variances and plural other workloads are characterized by a constant demand type in that they have relatively low utilization variance;
grouping said workloads by demand types to create demand-type groups of workloads;
allocating said hardware computing resources to said groups at least in part according to their respective demand types; and
wherein said workloads are grouped into demand-type groups, said demand-type groups are assigned to partitions and said allocating involves transferring workloads into or out of said partitions.

39. A system comprising non-transitory computer-readable storage media encoded with code that, when executed by a processor, causes:
monitoring utilization of hardware computing resources by workloads to obtain respective utilization histories for said workloads;
classifying said workloads according to demand type as a function of their respective utilization histories so that plural workloads are characterized by an intermittent demand type in that they have relatively high utilization variances and plural other workloads are characterized by a constant demand type in that they have relatively low utilization variance;
grouping said workloads by demand types to create demand-type groups of workloads;
allocating said hardware computing resources to said groups at least in part according to their respective demand types; and
wherein said workloads are grouped into demand-type groups, said demand-type groups are assigned to partitions, and said allocating involves transferring workload components into or out of said partitions and transferring resources into or out of said partitions.

40. A system comprising non-transitory computer-readable storage media encoded with code that, when executed by a processor, causes:
monitoring utilization of hardware computing resources by workloads to obtain respective utilization histories for said workloads;
classifying said workloads according to demand type as a function of their respective utilization histories so that plural workloads are characterized by an intermittent demand type in that they have relatively high utilization variances and plural other workloads are characterized by a constant demand type in that they have relatively low utilization variance;
grouping said workloads by demand types to create demand-type groups of workloads;
allocating said hardware computing resources to said groups at least in part according to their respective demand types; and
wherein said workloads are grouped into demand-type groups, said demand-type groups are assigned to existing partitions and/or to newly created partitions, and said allocating involves creating said partitions as necessary and transferring workload components into or out of said partitions and transferring resources into or out of said partitions.

* * * * *